United States Patent [19]
Ely et al.

[11] Patent Number: 6,130,704
[45] Date of Patent: Oct. 10, 2000

[54] CONTROLLING MOVEMENT OF VIDEO SURVEILLANCE CAMERAS

[75] Inventors: Reuel Andrew Ely, Plantation; Robert Nelson, Delray Beach; Alan E. Willard, Wellington, all of Fla.

[73] Assignee: Sensormatics Electronics Corporation, Boca Raton, Fla.

[21] Appl. No.: 09/177,838

[22] Filed: Oct. 22, 1998

[51] Int. Cl.⁷ .................................................. H04N 7/18
[52] U.S. Cl. ......................... 348/143; 348/211; 348/214
[58] Field of Search ................................. 348/143, 211, 348/214; H04N 7/18

[56] References Cited

U.S. PATENT DOCUMENTS

| | | | |
|---|---|---|---|
| 4,709,265 | 11/1987 | Silverman et al. | 348/143 |
| 4,736,218 | 4/1988 | Kutman | 348/143 |
| 4,833,534 | 5/1989 | Paff et al. | 348/143 |
| 4,918,473 | 4/1990 | Blackshear | 348/143 |
| 4,992,866 | 2/1991 | Morgan | 348/143 |
| 5,111,288 | 5/1992 | Blackshear | 348/143 |
| 5,185,667 | 2/1993 | Zimmermann | 348/143 |
| 5,359,363 | 10/1994 | Kuban et al. | 38/143 |
| 5,384,588 | 1/1995 | Martin et al. | 348/143 |
| 5,627,616 | 5/1997 | Sergeant et al. | 348/143 |
| 5,686,957 | 11/1997 | Baker | 348/36 |
| 5,689,304 | 11/1997 | Jones et al. | 348/143 |
| 5,790,910 | 8/1998 | Haskin | 396/427 |
| 5,796,426 | 8/1998 | Gullichsen et al. | 348/147 |
| 5,870,135 | 2/1999 | Glatt et al. | 348/39 |
| 5,872,594 | 2/1999 | Thompson | 348/143 |
| 5,929,904 | 7/1999 | Uchida | 348/143 |
| 5,974,978 | 11/1999 | Brown et al. | 104/304 |
| 6,002,430 | 12/1999 | McCall et al. | 348/143 |

*Primary Examiner*—Howard Britton
*Attorney, Agent, or Firm*—Quarles & Brady LLP

[57] ABSTRACT

A method for moving and controlling a video surveillance camera comprises the steps of: supporting a video surveillance camera for tilting movements about mutually perpendicular axes; transforming tilt and pan commands into angular movement commands; rotating the camera about the mutually perpendicular axes responsive to the angular movement commands, the video camera having a substantially hemispherical field of view as the camera is pivoted about the axes and the video camera generating a picture which is inverted relative to true horizontal over a portion of the field of view; and, automatically rotating the picture to a substantially right-side-up orientation whenever necessary, whereby a right-side-up picture is provided throughout the field of view without continuous panning rotation of the video camera. In a corresponding system, a servo mechanism tilts the video camera, a motion controller transforms the tilt and pan commands and a video signal processor rotates the picture.

23 Claims, 3 Drawing Sheets

CONTROLLING MOVEMENT OF VIDEO SURVEILLANCE CAMERAS

BACKGROUND OF THE INVENTION

1. Field of the Invention

This invention relates to the field of video surveillance cameras, and in particular, to a method and apparatus for controlling movement of a video surveillance camera without relying on a continuous axis of rotation.

2. Description of Related Art

Current implementations of video surveillance camera movement apparatus require that one axis of movement be capable of continuous rotation. This is typically the vertical axis, also referred to as the pan axis. This vertical axis allows continuous horizontal positioning of the camera. The horizontal axis, also referred to as the tilt axis, is typically limited to less than 180 degrees of movement. This limitation is not a problem in and of itself, because video surveillance cameras are usually mounted adjacent to ceilings or walls. The required field of view in almost every surveillance situation is substantially hemispherical. In order to implement continuous pan rotation, a mechanism must be included in the camera movement device which allows the passage of power, video signals and data signals as appropriate, between a stationary base and the surveillance camera, through the vertical and horizontal axes. The transmission of signals through a continuously rotating axis is typically accomplished with a slip ring mechanism using electrical brushes and conductive rings. This kind of slip ring mechanism is costly to manufacture, has a limited life and can cause noise in the video and data signals, all of which eventually lead to operating problems with the camera, or degraded video signals, or both.

An alternative solution utilizes radio frequency transmitters and receivers to transmit the video and data signals and air core transformers to couple power. These alternative methods are also costly and are also subject to reliability problems.

A long-felt need exists for a video surveillance camera movement control system which eliminates the need for a continuous rotation axis, and the problems resulting from such structure.

SUMMARY OF THE INVENTION

The long-felt need is satisfied in accordance with an aspect of the inventive arrangements by a movement control system in which a surveillance camera and lens assembly is mounted to a support which is movable on mutually perpendicular axes relative to a neutral horizontal position, in such a manner that the lens can be pointed in any direction in an adjacent and substantially hemispherical field of view without using a continuous rotational axis.

The rotational movement about the axes results in a rotation of the image transmitted by the camera relative to true horizontal. In accordance with a further aspect of the inventive arrangements, a video signal processor automatically rotates the image transmitted by the surveillance camera, as needed, to a correct, that is a right-side-up, orientation.

In order to facilitate automatic and manual camera position control, a motion controller in accordance with a another aspect of the inventive arrangements automatically transforms conventional tilt and pan commands, as would be required for a movement system utilizing a continuous rotation axis, into angular movement commands for operating a servo mechanism controlling the rotation.

The inventive arrangements result in reduced implementation costs and increased reliability of the camera movement elements. The inventive arrangements also accommodate the use of alternative methods for moving the camera, such as linear motors and linear actuators, for example thermal actuators and magnetostrictive actuators.

A system for moving and controlling a video surveillance camera, in accordance with the inventive arrangements, comprises: a video surveillance camera mounted for tilting movements about mutually perpendicular axes; a servo mechanism for tilting said video camera about said mutually perpendicular axes, said video camera having a substantially hemispherical field of view as said video camera is tilted about said axes and said video camera generating a picture which is rotated relative to true horizontal over a portion of said field of view; a motion controller for transforming tilt and pan commands into angular movement commands for operating said servo mechanism; and, a video signal processor responsive to video camera position information for automatically rotating said picture to a substantially right-side-up orientation relative to said true horizontal when said picture generated by said video camera is rotated relative to said true horizontal, whereby said system supplies a right-side-up picture throughout said field of view without continuous panning rotation of said video camera.

The system can further comprise a manual control for generating said tilt and pan commands, or the motion controller can be responsive to a predetermined sequence of said tilt and pan commands, or both.

The motion controller can perform a linear transformation of said tilt and pan commands into said angular movement commands. The video signal processor can operate responsive to said tilt and pan commands or said angular movement commands.

The can further comprise: a support member having a mount depending therefrom; a platform supported on said mount for said tilting movements about said mutually perpendicular axes; said servo mechanism being disposed between said support member and said platform for respectively tilting said platform about said mutually perpendicular axes; and, said video surveillance camera being mounted on said platform. The mount can comprise a ball and said platform can comprise a socket engageable with said ball. The servo mechanism can comprise independently operable and longitudinally extensible and retractable members.

The video camera can have an optical axis extending substantially perpendicularly from a plane defined by said mutually perpendicular tilt axes, or alternatively, can have an optical axis extending substantially non-perpendicularly from a plane defined by said mutually perpendicular tilt axes.

A method for moving and controlling a video surveillance camera, in accordance with the inventive arrangements, comprises the steps of: supporting a video surveillance camera for tilting movements about mutually perpendicular axes; transforming tilt and pan commands into angular movement commands; rotating said camera about said mutually perpendicular axes responsive to said angular movement commands, said video camera having a substantially hemispherical field of view as said camera is pivoted about said axes and said video camera generating a picture which is rotated relative to true horizontal over a portion of said field of view; and, automatically rotating said picture to a substantially right-side-up orientation when said picture generated by said video camera is rotated relative to said true horizontal, thereby providing a right-side-up picture throughout said field of view without continuous panning rotation of said video camera.

The method can further comprise the step of manually generating said tilt and pan commands, or generating a predetermined sequence of said tilt and pan commands, or both.

The method can comprise the step of linearly transforming said tilt and pan commands into said angular movement commands. The picture can be rotated responsive to said tilt and pan commands, or alternatively, responsive to said angular movement commands, or both.

The method can further comprise the step of substantially centrally aligning said video camera within said field of view when said video camera is untilted, or alternatively, substantially non-centrally aligning said video camera within said field of view when said video camera is untilted.

The method can also comprise the step of defining a substantially horizontal plane with said perpendicular axes.

DETAILED DESCRIPTION OF THE PREFERRED EMBODIMENTS

A video surveillance camera assembly and lens system is mounted on a movable and controllable platform, having a neutral horizontal orientation, which allows the camera to be pointed at any object of interest in a substantially hemispherical field of view without reliance on a continuous rotation axis. A movement system 10 in accordance with the inventive arrangements is illustrated in FIG. 1.

Figure 1:
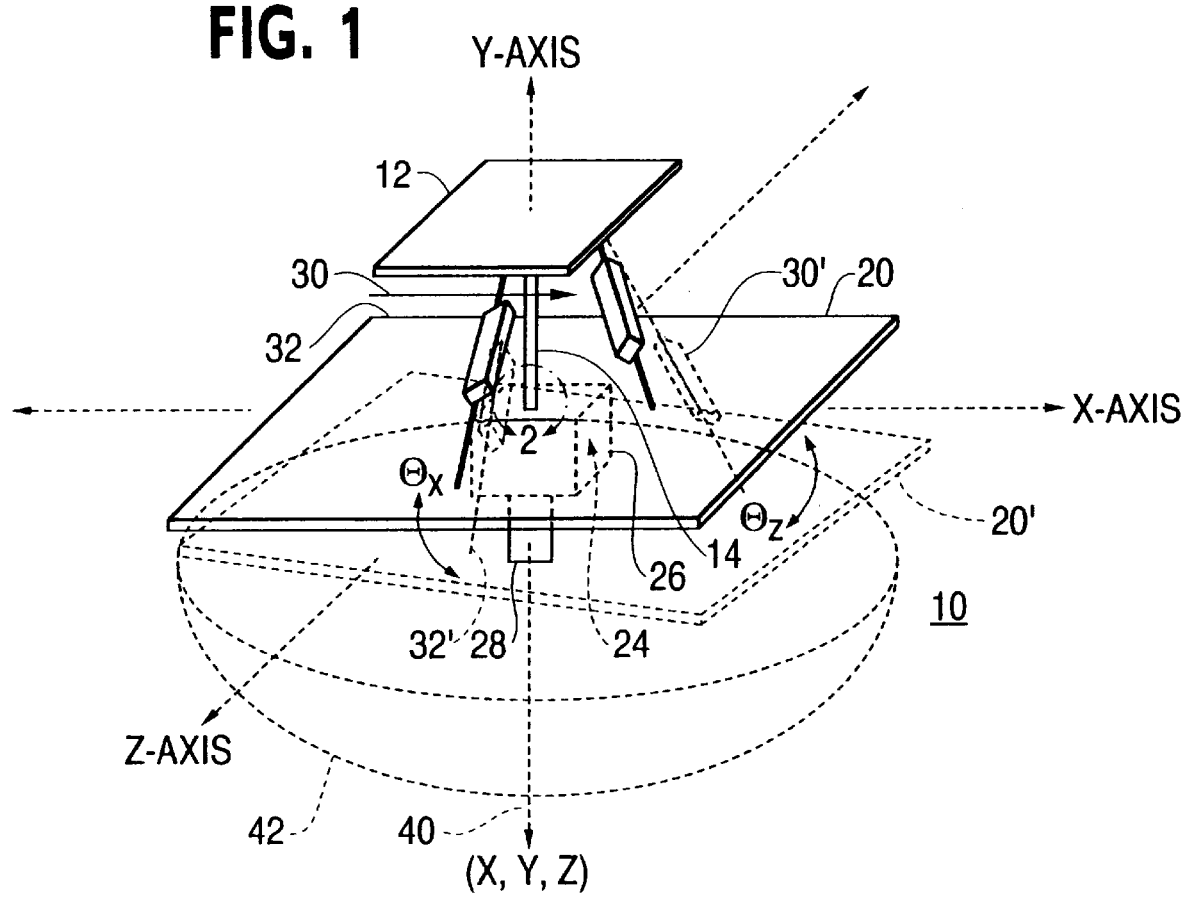
FIG. 1 is a diagram useful for explaining the movement and control system according to the inventive arrangements.

A camera movement system 10 in accordance with the inventive arrangements is shown in FIG. 1. A support 12 is adapted for mounting on a wall or ceiling. One portion of a ball and socket joint 14 is formed by a ball 18 extending downwardly from support 12 on a rod 16. A platform 20 is provided with an opening 20 is provided with an opening 22 formed in part by a cylindrical wall 23 and an annular, arcuate wall 25 forming a socket for receiving the ball 18. The ball and socket joint is shown in enlarged scale in FIG. 2.

The platform is free to rotate about the X-axis and the Z-axis, being supported by the ball and socket joint 14. The X-axis and the Z-axis are mutually perpendicular, and are also perpendicular to the Y-axis. For purposes of definition, and in accordance with the mounting arrangement most likely to be implemented, the Y-axis is a vertical axis. The X-axis and the Z-axis define a horizontal plane. When the platform is in alignment with the plane formed by the X-axis and the Z-axis, the platform is said to be in a neutral position, that is, not rotated with respect to either the X-axis or the Z-axis.

Rotational movement about the X-axis is denoted by $\Theta_X$. Rotational movement about the Z-axis is denoted by $\Theta_Z$. Rotational movement about the Z-axis is effected by a servo mechanism 30, for example a linear motor or actuator. Rotational movement about the X-axis is effected by a servo mechanism 32, for example linear motor or actuator, such as a thermal actuator or a magnetostrictive actuator. The servo mechanisms are connected between the bottom of support 12 and the top of platform 20.

Figure 2:
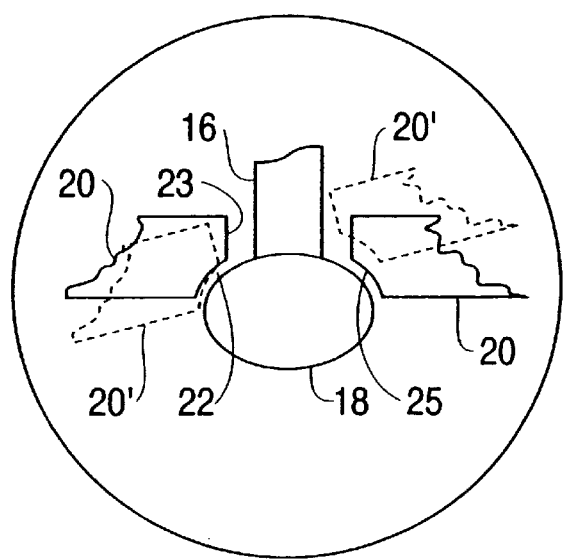
FIG. 2 is an enlarged view of a ball and socket joint used in the movement system of FIG. 1.

The camera assembly 24, which comprises a video surveillance camera 24 and a lens assembly 28 is mounted to the lower surface of platform 20. The camera and lens assembly have an optical axis indicated by vector (X, Y, Z). The solid line depiction of the platform 20 in FIGS. 1 and 2 represents the neutral position. In the neutral position, the optical axis points downwardly, along the Y-axis. The dashed line depiction of the platform in FIGS. 1 and 2, denoted by reference numeral 20', represents a rotated position. The servo mechanisms also have a corresponding dashed line representation, denoted by reference numerals 30' and 32'. The sum total of all possible rotations defines a field of view 42 for the camera which is substantially hemispherical.

Generally speaking, the closer the camera is mounted to an inside corner, for example, one wall and a ceiling, or two walls and a ceiling, the more limited will be the possible field of view. The maximum field of view in most cases will be substantially hemispherical as shown.

The input control signals for the servo mechanisms can be derived from a mathematical transformation of the conventional control inputs, which are referred to a tilt and pan. The pan axis is usually the continuously rotatable axis. To ensure compatibility with existing movement control systems, the conventional tilt and pan movements must be transformed to X and Z coordinates and the X and Z coordinates must be converted back into pan and tilt coordinates. The input for the servo mechanism can be derived mathematically from pan and tilt commands generated by a user for manual control or by a computer for automatic control.

Moreover, the image rotation caused by the X and Z movements must be calculated and the image must be rotated electronically into a normal, that is a right-side-up orientation, for viewing. The image rotation that occurs as a result of the movement of the camera and lens can be corrected electronically using information derived from the camera and lens position.

Figure 3:
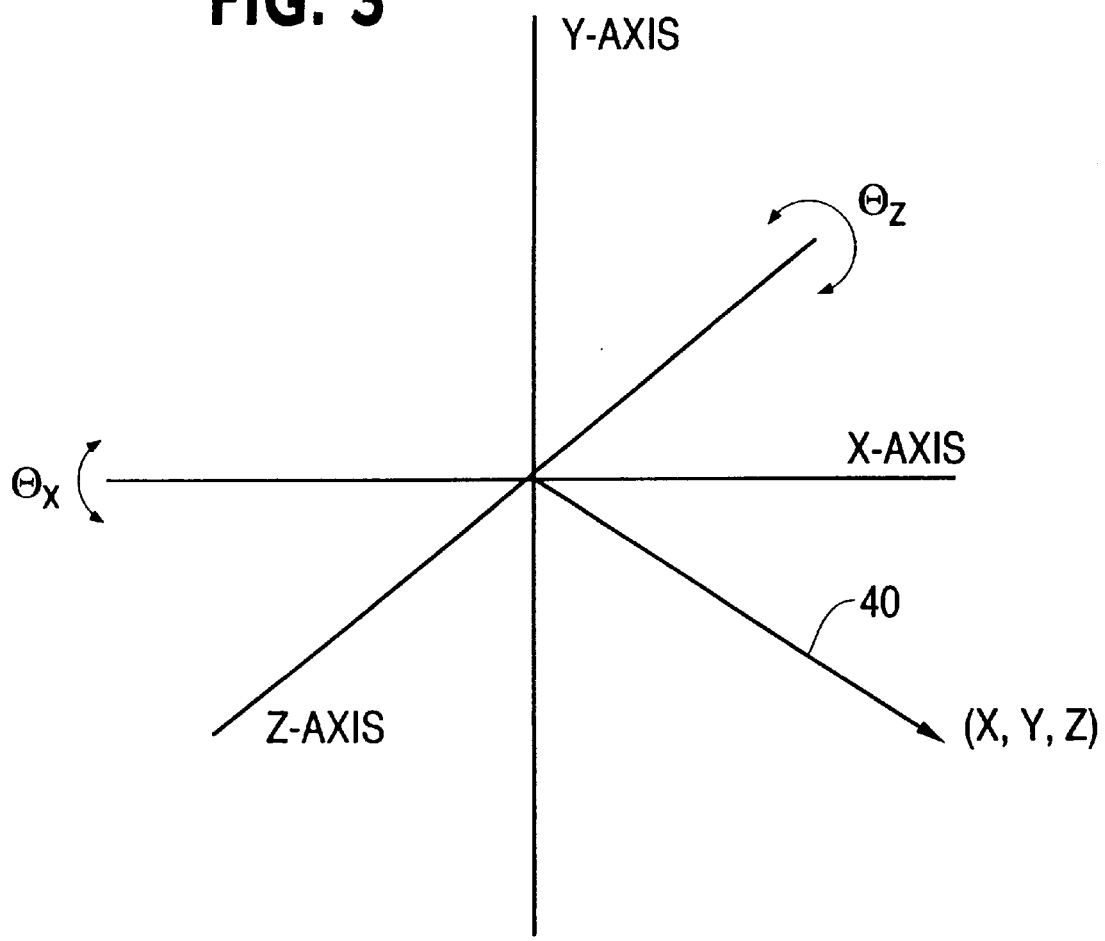
FIG. 3 is a diagram of a coordinate axis system useful for explaining transformation of movement controls.

An X, Y, Z coordinate axis system is shown in FIG. 3. The conversion of pan angles and tilt angles to the $\Theta_X$ and $\Theta_Z$ rotation angles is explained below. The camera view vector, corresponding to the optical viewing axis 40, can be rotated about the basis vectors. Rotation around the X-axis in the conventional system can be defined as tilt. Rotation about the Y-axis can be defined as pan. In the new system, rotation around the X-axis can be defined as altitude and rotation around the Z-axis can be defined as azimuth.

Rotation about the X-axis can transform the X, Y, Z coordinates of the camera view vector as follows, where X',Y',Z' are the transformed coordinates:

$$|X', Y', Z'| = |X, Y, Z| \begin{vmatrix} 1 & 0 & 0 \\ 0 & \cos\phi_X & -\sin\phi_X \\ 0 & \sin\phi_X & \cos\phi_X \end{vmatrix}$$

Rotation about the Y-axis can transform the X, Y, Z coordinates of the camera view vector as follows, where X',Y',Z' are the transformed coordinates:

$$|X', Y', Z| = |X, Y, Z| \begin{vmatrix} \cos\phi_Y & 0 & -\sin\phi_Y \\ 0 & 1 & 0 \\ \sin\phi_Y & 0 & \cos\phi_Y \end{vmatrix}$$

Rotation about the Z-axis can transform the X, Y, Z coordinates of the camera view vector as follows, where X',Y',Z' are the transformed coordinates:

$$|X', Y', Z| = |X, Y, Z| \begin{vmatrix} \cos\phi_Z & \sin\phi_Z & 0 \\ -\sin\phi_Z & \cos\phi_Z & 0 \\ 0 & 0 & 1 \end{vmatrix}$$

A camera that is pointing along the Y-axis with a vector of (0, −1, 0) can be positioned to a vector (X, Y, Z) by first providing a rotation about the X-axis angle of $\phi_T$ (tilt) and then a rotation about the Y-axis of $\phi_P$(pan).

$$|X, Y, Z| = |0, -1, 0| \begin{vmatrix} 1 & 0 & 0 \\ 0 & \cos\phi_T & -\sin\phi_T \\ 0 & \sin\phi_T & \cos\phi_T \end{vmatrix} \begin{vmatrix} \cos\phi_P & 0 & -\sin\phi_P \\ 0 & 1 & 0 \\ \sin\phi_P & 0 & \cos\phi_P \end{vmatrix}$$

$$|X, Y, Z| = |0 \quad -\cos\phi_T \quad \sin\phi_T| \begin{vmatrix} \cos\phi_P & 0 & -\sin\phi_P \\ 0 & 1 & 0 \\ \sin\phi_P & 0 & \cos\phi_P \end{vmatrix}$$

$X_{PT}=\sin\phi_T \sin\phi_P$;
$Y_{PT}=-\cos\phi_T$;
$Z_{PT}=\sin\phi_T \cos\phi_P$;

The same camera position can be reached by a rotation about the X-axis of $\phi_X$ and then a rotation about the Z-axis of $\phi_Z$.

$$|X, Y, Z| = |0, -1, 0| \begin{vmatrix} 1 & 0 & 0 \\ 0 & \cos\phi_X & -\sin\phi_X \\ 0 & \sin\phi_X & \cos\phi_X \end{vmatrix} \begin{vmatrix} \cos\phi_Z & \sin\phi_Z & 0 \\ -\sin\phi_Z & \cos\phi_Z & 0 \\ 0 & 0 & 1 \end{vmatrix}$$

$$|X, Y, Z| = |0 \quad -\cos\phi_T \quad \sin\phi_T| \begin{vmatrix} \cos\phi_Z & \sin\phi_Z & 0 \\ -\sin\phi_Z & \cos\phi_Z & 0 \\ 0 & 0 & 1 \end{vmatrix}$$

$X_{XZ}=\cos\phi_X \sin\phi_Z$;
$Y_{XZ}=-\cos\phi_X \cos\phi_Z$;
$Z_{XZ}=\sin\phi_X$;

Given that:
$X_{PT}=X_{XY}$;
$Y_{PT}=Y_{XY}$;
$Z_{PT}=Z_{XY}$;

First solve for the Z component:
$\sin\phi_X=-\sin\phi_T \sin\phi_P$;
$\phi_X=\sin^{-1}(\sin\phi_T \sin\phi_P)$ for:

$-\Pi/2 \leq \phi_Z \leq \Pi/2$ $-\Pi/2 \leq \phi_X \leq \Pi/2$ $0 \leq \phi_T \leq \Pi/2$ $0 \leq \phi_P \leq 2\Pi$ Using the expression for the X component, and then dividing each side by the equivalent expression for the Y component yields:

$$\frac{\cos\phi_X \sin\phi_Z}{-\cos\phi_X \cos\phi_Z} = \frac{\sin\phi_T \sin\phi_P}{-\cos\phi_T}$$

$\tan\phi_Z=\tan\phi_T \sin\phi_P$;
$\phi_Z=\tan^{-1}(\tan\phi_T \sin\phi_P)$ for:

$-\Pi/2 \leq \phi_Z \leq \Pi/2$ $-\Pi/2 \leq \phi_X \leq \Pi/2$ $0 \leq \phi_T \leq \Pi/2$ $0 \leq \phi_P \leq 2\Pi$ Thus, the X/Y transformation can be expressed in terms of the pan/tilt angles.

The pan/tilt transformation can also be expressed in terms of the X/Y angles using the same type of analysis:
First solve for the Y component:
$-\cos\phi_T=-\cos\phi_X \cos\phi_Z$;
$\phi_T=\cos^{-1}(\cos\phi_X \cos\phi_Y)$ for:

$-\Pi/2 \leq \phi_Z \leq \Pi/2$ $-\Pi/2 \leq \phi_X \leq \Pi/2$ $0 \leq \phi_T \leq \Pi/2$ $0 \leq \phi_P \leq 2\Pi$ Using the expression for the X component, and then dividing each side by the equivalent expression for the Z component yields:

$$\frac{\sin\phi_T \sin\phi_P}{\sin\phi_T \cos\phi_P} = \frac{\cos\phi_X \sin\phi_Z}{\sin\phi_X}$$

$\tan\phi_P=\cot\phi_X \sin\phi_Z$;
$\phi_P=\tan^{-1}(\cot\phi_X \sin\phi_Z)$ for:

$-\Pi/2 \leq \phi_Z \leq \Pi/2$ $-\Pi/2 \leq \phi_X \leq \Pi/2$ $0 \leq \phi_T \leq \Pi/2$ $0 \leq \phi_P \leq 2\Pi$ If the apparent horizon of the camera is parallel to the x-axis, then the apparent horizon for the camera is only rotated by rotation along the z-axis. Thus, in order to correct for the difference between true horizontal and the apparent horizon of the picture transmitted by the camera, the image must be rotated by $-\phi_Z$. Where X and Y are the coordinates for the camera image and X' and Y' are the transformed coordinates presented to the monitor. The rotation by $-\phi_Z$ must be such that: 11φ 1.

$X'=X \cos(-\phi_Z)-Y \sin(-\phi_Z)$
$Y'=X \sin(-\phi_Z)+Y \cos(-\phi_Z)$ for:

$-\Pi/2 \leq \phi_Z \leq \Pi/2$ $0 \leq \phi_X \leq \Pi/2$ $X'=X \cos(-\phi_Z+\Pi)-Y \sin(-\phi_Z+\Pi)$,
$Y'=X \sin(-\phi_Z+\Pi)+Y \cos(-\phi_Z+\Pi)$, for:

$-\Pi/2 \leq \phi_Z \leq \Pi/2$ $-\Pi/2 \leq \phi_X < 0$

Figure 4:
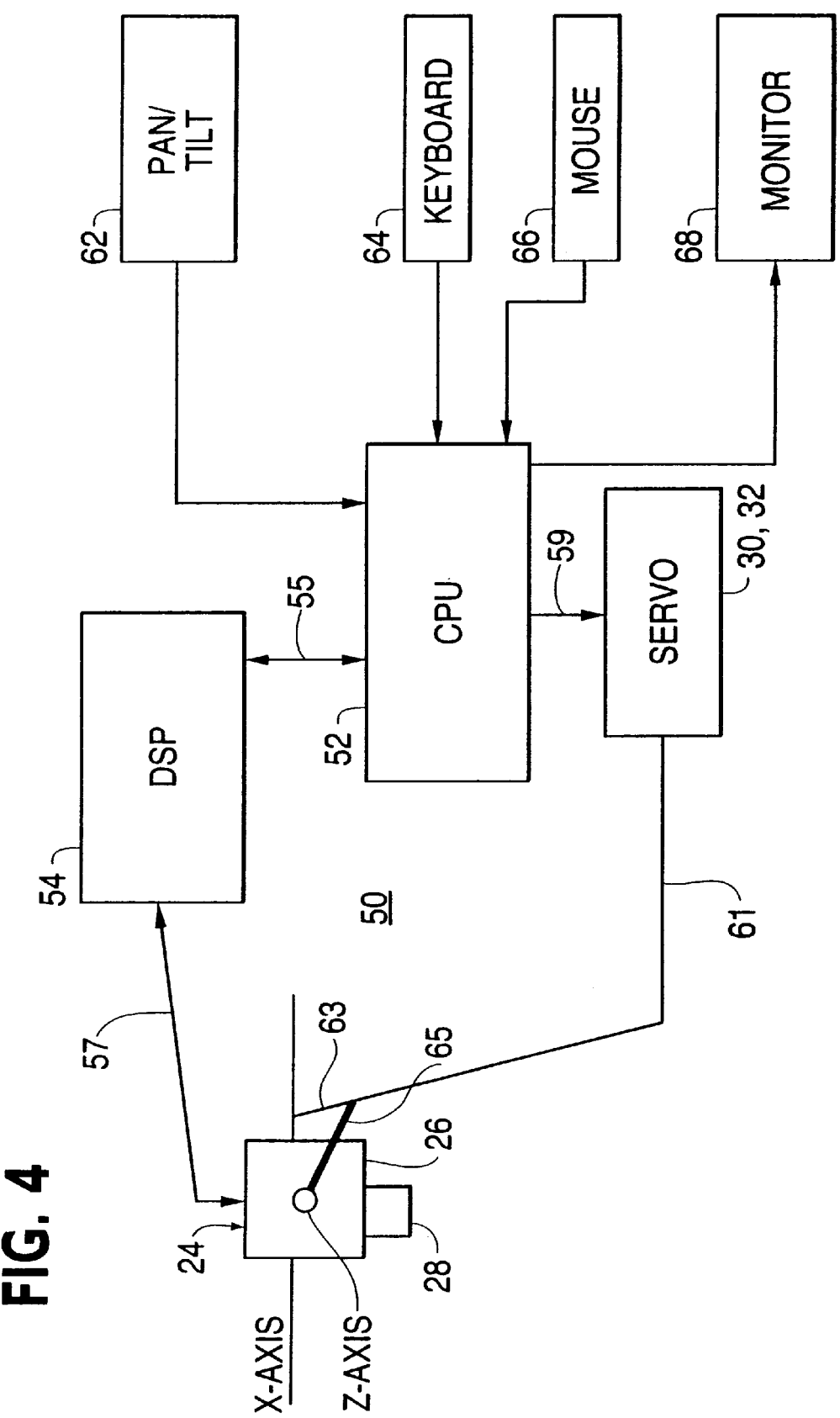
FIG. 4 is a block diagram of a camera movement system according to the inventive arrangements.

A movement control system 50 is shown in block diagram form in FIG. 4. A central processing unit (CPU) 52 performs the mathematical transformation of servo mechanism control inputs. Depending upon the platform for the controller, which can be a personal computer or a dedicated processor, the control inputs can be generated by one or more of a conventional pan and tilt control 62, a keyboard 64 and a mouse 66. The CPU also provides an output video signal for display by a monitor 68.

A digital signal processor (DSP) 54 communicates with the CPU 52 and with the video camera 26. Video signals are supplied to the DSP 54 and control data is supplied to the camera over one or more lines 57. The DSP 54 rotates the picture image generated by the camera, as explained above, and supplies over one or more lines 55 a video signal with a right-side-up image for subsequent processing by the CPU 52 and transmission to the monitor 68. A hardware solution can also be implemented. The CPU 52 sends control signals over one or more lines 59 to the servo mechanisms 30 and 32 to rotate the platform, and the camera mounted thereon about the X-axis and the Z-axis. The mechanical connection to the camera, which is mounted on the platform, is represented by line 61, having branches 63 and 65.

The transformation of coordinates and the rotation of the image can be accomplished so quickly that an operator or attendant cannot ascertain from operation of the movement control system itself that the conventional system has been replaced, so that no additional or special training is needed to operate the system.

What is claimed is:

1. A system for moving and controlling a video surveillance camera, comprising:

a video surveillance camera mounted for tilting movements about mutually perpendicular axes defining a plane, said tilting movements exclusively comprising rotation of an optical viewing axis of said camera about each of said axes defining said plane;

a servo mechanism for rotating said video camera about each of said mutually perpendicular axes, said video camera having a substantially hemispherical field of view as said video camera is rotated about said axes and said video camera generating a picture which is rotated relative to true horizontal over a portion of said field of view;

a motion controller for operating said servo mechanism and for transforming tilt and pan commands into angular movement commands exclusive of rotation of said optical viewing axis about a third axis perpendicular to said axes forming said plane; and, a video signal processor responsive to video camera position information for automatically rotating said picture to a substantially right-side-up orientation relative to said true horizontal when said picture generated by said video camera is rotated relative to said true horizontal, whereby said system supplies a right-side-up picture throughout said field of view without continuous panning rotation of said video camera.

2. The system of claim 1, further comprising a manual control for generating said tilt and pan commands.

3. The system of claim 1, wherein said motion controller is responsive to a predetermined sequence of said tilt and pan commands.

4. The system of claim 1, wherein said motion controller performs a linear transformation of said tilt and pan commands into said angular movement commands.

5. The system of claim 1, wherein said video signal processor is responsive to said tilt and pan commands.

6. The system of claim 1, wherein said video signal processor is responsive to said angular movement commands.

7. The system of claim 1, further comprising:

a support member having a mount depending therefrom;

a platform supported on said mount for said tilting movements about said mutually perpendicular axes;

said servo mechanism being disposed between said support member and said platform for respectively tilting said platform about said mutually perpendicular axes; and, said video surveillance camera being mounted on said platform.

8. The system of claim 7, wherein said mount comprises a ball and said platform comprises a socket engageable with said ball.

9. The system of claim 7, wherein said servo mechanism comprises independently operable and longitudinally extensible and retractable members.

10. The system of claim 1, wherein said video camera has an optical axis extending substantially perpendicularly from a plane defined by said mutually perpendicular tilt axes.

11. The system of claim 1, wherein said video camera has an optical axis extending substantially non-perpendicularly from a plane defined by said mutually perpendicular tilt axes.

12. A method for moving and controlling a video surveillance camera, comprising the steps of:

supporting a video surveillance camera for tilting movements about mutually perpendicular axes defining a plane, said tilting movements exclusively comprising rotation of an optical viewing axis of said camera about each of said axes defining said plane;

transforming tilt and pan commands into angular movement commands exclusive of rotation of said optical viewing axis about a third axis perpendicular to said axes forming said plane;

rotating said camera about each of said mutually perpendicular axes responsive to said angular movement commands, said video camera having a substantially hemispherical field of view as said camera is pivoted about said axes and said video camera generating a picture which is rotated relative to true horizontal over a portion of said field of view; and, automatically rotating said picture to a substantially right-side-up orientation when said picture generated by said video camera is rotated relative to said true horizontal, thereby providing a right-side-up picture throughout said field of view without continuous panning rotation of said video camera.

13. The method of claim 12, further comprising the step of manually generating said tilt and pan commands.

14. The method of claim 12, further comprising the step of generating a predetermined sequence of said tilt and pan commands.

15. The method of claim 12, comprising the step of linearly transforming said tilt and pan commands into said angular movement commands.

16. The method of claim 12, further comprising the step of rotating said picture responsive to said tilt and pan commands.

17. The method of claim 12, further comprising the step of rotating said picture responsive to said angular movement commands.

18. The method of claim 12, further comprising the step of substantially centrally aligning said video camera within said field of view when said video camera is untilted.

19. The method of claim 12, further comprising the step of substantially non-centrally aligning said video camera within said field of view when said video camera is untilted.

20. The method of claim 12, further comprising the step of defining a substantially horizontal plane with said mutually perpendicular axes.

21. A system for moving and controlling a video surveillance camera, comprising:

a video surveillance camera mounted for tilting movements about mutually perpendicular axes;

a support member having a mount depending therefrom;

a platform supported on said mount for said tilting movements about said mutually perpendicular axes, said video surveillance camera being mounted on said platform;

a servo mechanism for tilting said video camera about said mutually perpendicular axes, said servo mechanism being disposed between said support member and said platform for respectively tilting said platform about said mutually perpendicular axes;

said video camera having a substantially hemispherical field of view as said video camera is tilted about said axes and said video camera generating a picture which is rotated relative to true horizontal over a portion of said field of view;

a motion controller for transforming tilt and pan commands into angular movement commands for operating said servo mechanism; and, a video signal processor responsive to video camera position information for automatically rotating said picture to a substantially right-side-up orientation relative to said true horizontal when said picture generated by said video camera is rotated relative to said true horizontal, whereby said system supplies a right-side-up picture throughout said field of view without continuous panning rotation of said video camera.

22. The system of claim 21, wherein said mount comprises a ball and said platform comprises a socket engageable with said ball.

23. The system of claim 21, wherein said servo mechanism comprises independently operable and longitudinally extensible and retractable members.

* * * * *

UNITED STATES PATENT AND TRADEMARK OFFICE
CERTIFICATE OF CORRECTION

PATENT NO. : 6,130,704
DATED : October 10, 2000
INVENTOR(S) : Reuel Andrew Ely, Plantation; Robert Nelson, Delray Beach; Alan E. Willard, Wellington, all of Fla.

Page 1 of 1

It is certified that error appears in the above-identified patent and that said Letters Patent is hereby corrected as shown below:

Title page,
Item [73], in the Assignee name, replace "Sensormatics" with -- Sensormatic --

Column 5,
Line 31, replace "COS" with -- cos --
Line 42, replace "$\cos\Phi_T \sin\Phi_T$" with -- $\cos\Phi_x \sin\Phi_x$ --

Column 6,
Line 52, replace "$-\Phi_z$" with -- $-\theta_z$ --
Line 54, replace "$-\Phi_z$" with -- $-\theta_z$ --
Line 56, replace "$-\Phi_z$" with -- $-\theta_z$ -- (both occurrences)
Line 57, replace "$-\Phi_z$" with -- $-\theta_z$ -- (both occurrences)
Line 63, replace "$-\Phi_z$" with -- $-\theta_z$ -- (both occurrences)
Line 64, replace "$-\Phi_z$" with -- $-\theta_z$ -- (both occurrences)

Signed and Sealed this

Twenty-fifth Day of December, 2001

Attest:

*Attesting Officer*

JAMES E. ROGAN
*Director of the United States Patent and Trademark Office*